Dec. 23, 1969     M. P. GASSMAN     3,485,303

DUAL-RANGE TRACTOR-IMPLEMENT DRAFT CONTROL SYSTEM

Filed May 10, 1967     3 Sheets-Sheet 1

*INVENTOR.*
MAX P. GASSMAN

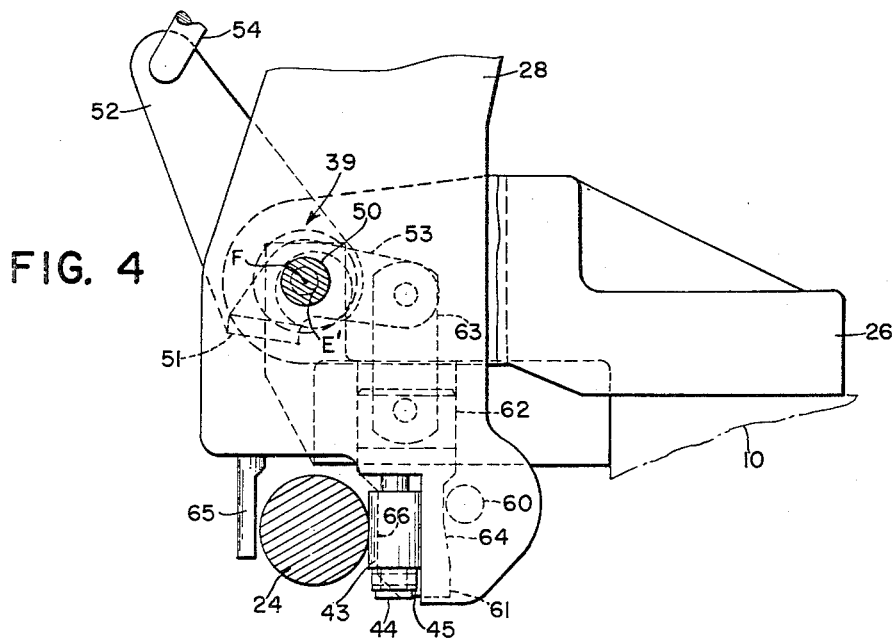
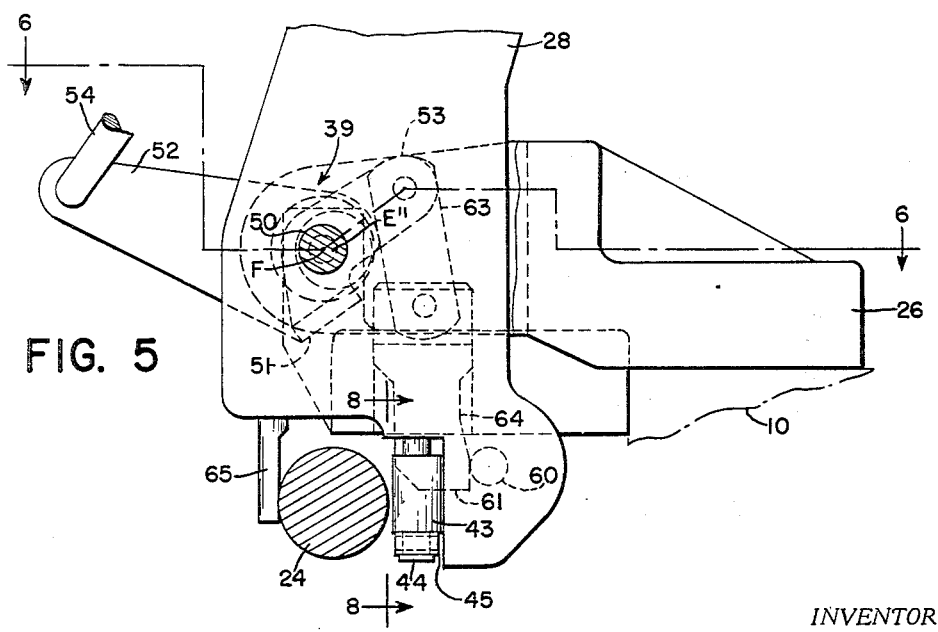

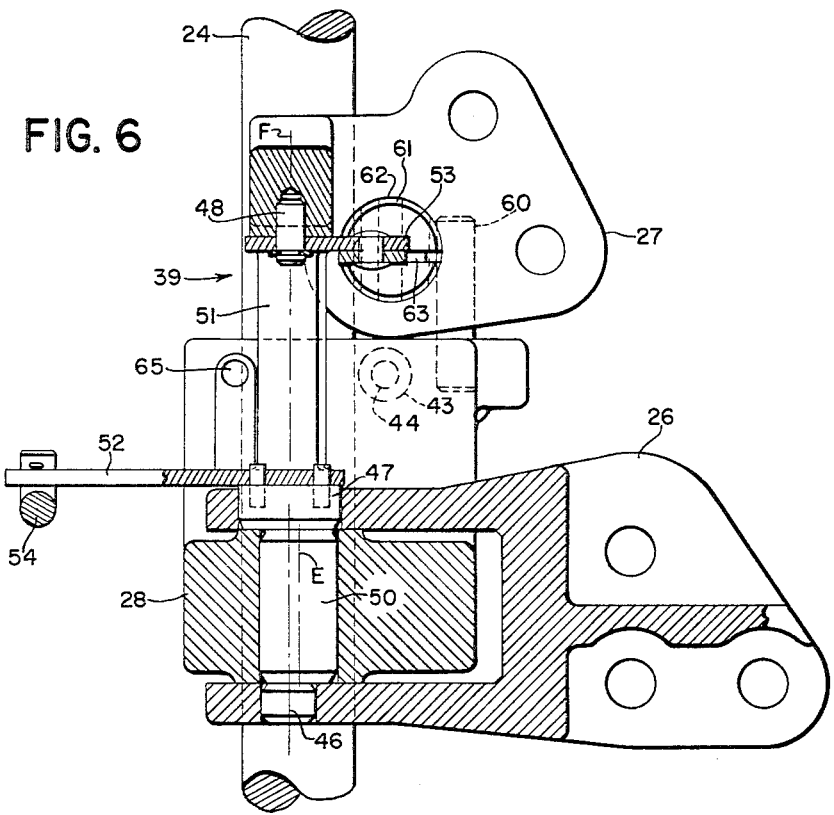
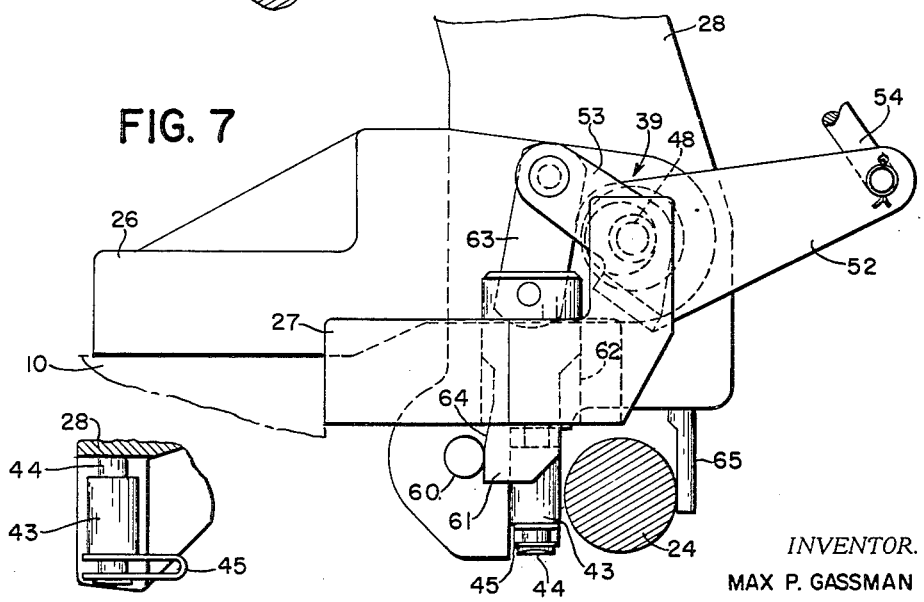

United States Patent Office 3,485,303
Patented Dec. 23, 1969

3,485,303
DUAL-RANGE TRACTOR-IMPLEMENT DRAFT CONTROL SYSTEM
Max Paul Gassman, Waterloo, Iowa, assignor to Deere & Company, Moline, Ill., a corporation of Delaware
Filed May 10, 1967, Ser. No. 637,480
Int. Cl. A01b 63/112
U.S. Cl. 172—7                                    10 Claims

ABSTRACT OF THE DISCLOSURE

A tractor-implement draft control system featuring selective use of the system in large or small tractors or selective setting of the system in one type of tractor for response to either light or heavy draft loads by means of effecting variations in the time of response of the system to changes in draft load.

BACKGROUND OF THE INVENTION

The field of invention relates generally to agricultural tractors and implements and particularly to draft control.

Tractor-implement draft control systems are of course well known and all operate generally on the principle of controlling the valve of a hydraulic system on the tractor, for example, to adjust the tractor-implement hitch linkage in response to changes in implement draft. Each draft control system is designed primarily for use on a tractor of a specific capacity and in accordance with the broad class of implements with which it will be used. Thus, the draft control system for a small tractor cannot be used interchangeably in a larger tractor, for example. Also, where a relatively large tractor has a correspondingly capacitated draft control system designed primarily to accommodate large-draft implements, it is difficult to use this tractor with light-draft implements because such implements ordinarily do not develop sufficient draft force to activate the system.

Examples of U.S. prior art patents in this area are: U.S. Patent 2,921,638, issued Jan. 19, 1960 to W. H. Du Shane; U.S. Patent 2,924,285, issued Feb. 9, 1960 to W. H. Du Shane et al.; and U.S. Patent 2,974,733, issued Mar. 14, 1961 to E. H. Fletcher.

SUMMARY OF THE INVENTION

The invention provides means for selectively varying the response of the draft control system to the input signal received from the implement, particularly by selectively adjusting the relationship between the signal member or draft responder and the mechanism that transmits the signal to the valve for the hydraulic power cylinder or equivalent controller for an equivalent power means. In particular, this is accomplished by providing for two different sets of draft circumstances: (a) light draft operates only in the lower part of a total range of response to activate the system and (b) heavy draft operates only in an upper part of this range to activate the system. In both situations, the total movement of the valve-actuating linkage is the same and, by limiting the response to two different parts of the range, over-loading of the valve linkage is avoided, as is the necessity for providing either two types of valves and separate linkages, one for each condition, or special linkage to accommodate overtravel in certain conditions.

DESCRIPTION OF THE DRAWINGS

FIG. 4 is an enlarged view, partly in section, of the lower portion of the structure of FIGS. 2 and 3, showing the system in one condition.

FIG. 5 is a view similar to FIG. 4 but showing the system in a second condition.

FIG. 6 is a section taken generally along the line 6—6 of FIG. 5.

FIG. 7 is a side view, partly in section, taken from the side of the structure opposite to that of FIG. 4.

FIG. 8 is a fragmentary sectional view as seen substantially along the line 8—8 of FIG. 5.

DESCRIPTION OF THE PREFERRED EMBODIMENT

Figure 1:
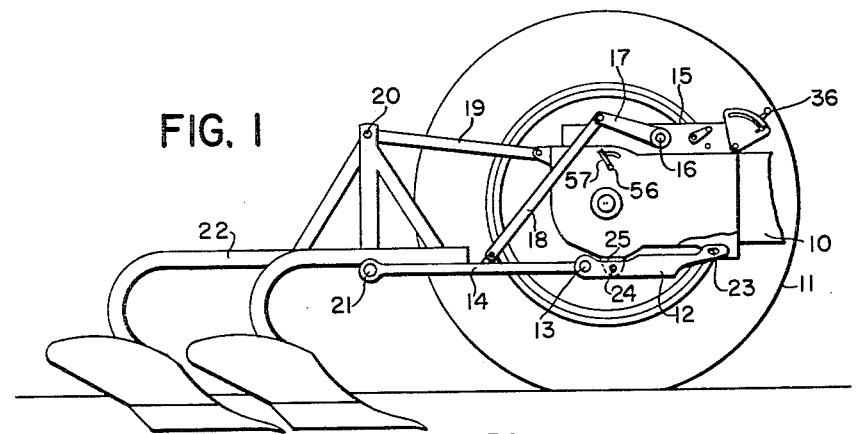
FIG. 1 is a fragmentary elevation of the rear portion of a tractor and associated implement, the near wheel being removed to expose the structure.

The tractor is generally typical of prior constructions and has a main rear body 10 carried on traction wheels, only one of which is shown at 11. Approximately supported beneath the body 10, in a manner to be presently described, is a basic hitch or A-frame to which are pivotally connected at 13 a pair of rearwardly extending lower draft links 14, only one of which is shown.

An upper portion of the body 10 carries a housing 15 within which is contained power means, to be described in detail later, including a transverse rockshaft 16 conventionally having at each of its external ends lift arms 17 connected by lift links 18 to the lower draft links 14.

The lower draft links 14 comprise, in combination with a top link 19, a typical three-point hitch linkage, connected at upper and lower hitch points 20 and 21 to a tillage implement, here a two-moldboard plow 22.

The A-frame 12 may be of the type disclosed in the above Fletcher Patent 2,974,733, characterized in that its forward end has a fore-and-aft lost-motion support 23 with the tractor and a rearward portion is supported at laterally opposite sides by a transverse bar 24 supported adjacent to its opposite ends on the tractor body 10 as at 25, so that rearwardly exerted draft forces, applied in tension through the links 14, cause the outer ends of the bar to deflect rearwardly, resulting in forward deflection or bowing of its midportion, all as pointed out in the above U.S. Patent 2,924,285 to Du Shane et al.

The basic structure other than that shown in FIG. 1 is located primarily interiorly of the housing comprising the tractor body 10. This structure is best illustrated in FIGS. 2–8, wherein it is shown that a pair of supports 26 and 27 are mounted in suitable fashion on the body 10, internally thereof, for supporting a force-transmitting lever 28 operative between a midportion of the bending bar 24 (hereinafter referred to as the "responder") and power means for controlling the angular position of the rockshaft 16.

Figure 2:
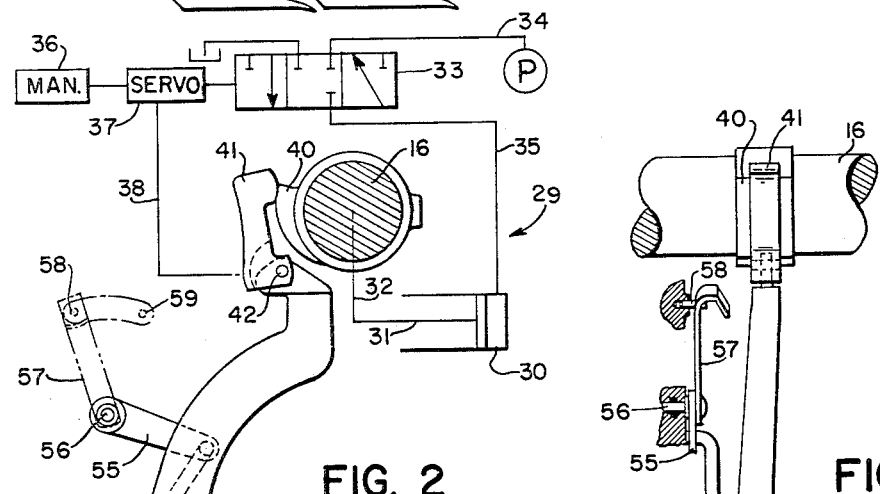
FIG. 2 is an enlarged view, partly schematic and partly in section, illustrating the basic internal mechanism.

This power means is indicated in its entirety by the numeral 29 in FIG. 2 and typically comprises a hydraulic cylinder 30 having its piston rod 31 connected to an arm 32 rigidly affixed to the rockshaft 16. The controller for the power means is in the form of a valve 33, shown in FIG. 2 in its neutral position to cut off the pressure line 34 from a pump P and a cylinder line 35 between the valve and the cylinder 30. The valve may be initially operated manually, as by a control lever 36 on the tractor, represented schematically by the rectangle in FIG. 2. Interposed between the manual control and the valve 33 is a typical servo mechanism, indicated at 37 and represented here by a conventional rectangle. The servo is conventionally linked at 38 to the upper end of the lever 28 in a manner such as that shown in the above Du Shane Patent 2,921,638.

The lever 28 is carried by fulcrum means 39 on the supports 26 and 27 for rocking back and forth about a transverse axis above and parallel to the lengthwise axis of the bending bar 24. The rockshaft 16 is provided intermediate its ends with a follow-up cam 40 as shown in any of the above-identified patents and, engageable with this cam, is a cam follower 41 pivoted at 42 to the upper end of the lever 28. The servo link 38 is associated with the cam follower in the patented manner noted above and the cam follower and pivot 42 comprise parts of first connecting means connecting or engaging the first (upper) end of the lever with the control means (valve 33) for the power means 29.

The second or lower end of the lever 28 includes second end means which may constitute the lower end itself as supplemented by a wear block 43, in this case carried by a vertical pin 44 depending from the lower end of the lever 28 and biased upwardly by a hairpin spring 45 (FIG. 8).

The means 43 is disposed so that it lies directly ahead of the intermediate portion of the bending bar 24, so that deflections of the bar in a forward direction will engage the wear block 43, causing the lever 28 to rock about the fulcrum means 39 for transmitting a signal to the valve 33 via the servo link 38 and servo means 37. For example, should the draft load increase, rearward tensional forces will be applied through the draft link 14 to the A-frame 12, causing the A-frame to shift rearwardly, resisted by the yielding bending bar 24, the outer ends of which will of course deflect rearwardly, causing the intermediate portion to bow forwardly into engagement with the wear block 43 (FIGS. 2 and 4), followed by counterclockwise rocking of the lever 28 and therefore applying a compression force through the servo link 38, whereby the valve 33 will shift to the right so that the pump applies fluid under pressure to the cylinder 30 for raising the implement by turning of the rockshaft 16. When the draft load falls off, the bending bar will tend to return to normal, followed by clockwise rocking of the lever 28 as the valve 33 again returns to neutral. It should be understood, on the basis of the disclosures in the above-identified patents, that there are enough forces involved in the centering of the valve and in the servo and servo link as to tend to bias the lever 28 to its normal position (FIG. 2) and to tend to retain the lever 28 in equilibrium so that, unless it is acted upon by the responder or bending bar 24, it will maintain its position without transmitting any valve-operating forces to the valve 33.

Figure 3:
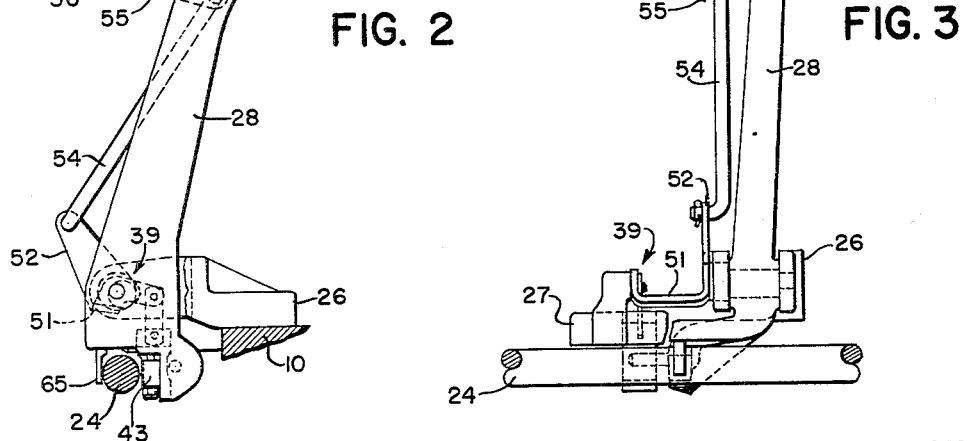
FIG. 3 is a fragmentary rear elevation, partly in section, of the structure shown in FIG. 2.

The details of the fulcrum means 39 are best disclosed in FIGS. 3 and 6, wherein it will be seen that the fulcrum includes a composite rockshaft made up of three coaxial cylindrical sections 46, 47 and 48, an eccentric portion 50 and a rigid interconnector part 51 which includes rigidly therewith a rearwardly extending arm 52 and a forwardly extending shorter arm 53. The three parts 46, 47 and 48 are coaxial on an axis F, and the axis of the eccentric portion 50 is shown at E (FIG. 6).

The rockshaft is bipositional between first and second positions, the former of which is shown in FIG. 4 and the latter in FIG. 5. FIG. 2 corresponds as to position to FIG. 4. In FIG. 4, the axis of eccentricity is represented at E', being slightly below and ahead of axis F. In FIG. 5, the changed position of axis E is shown at E'', being substantially horizontally alined with axis F and therefore farther ahead of axis F than point E' of FIG. 4. The rockshaft thus serves as means for selectively repositioning the lever 28, and especially its second end means 43, in two different positions relative to the front surface of the bending bar 24. This will be seen by a comparison of FIGS. 4 and 5; in the former figure, wear block 43 is in direct contact with the front surface of the bending bar 24, and in FIG. 5, the wear block 43 is spaced slightly ahead of the front surface of the binding bar. Stated otherwise, in the FIG. 4 situation, as soon as the center portion of the bar 24 deflects, it is immediately sensed by the means 43 to cause immediate counterclockwise rocking of the lever 28, but in FIG. 5, the bar 24 may deflect for a certain amount before contact is made with the wear block 43.

Changes in the position of the rockshaft as affecting the fulcrum means 39 are accomplished by linking the arm 52 by a link 54 to an upper arm 55 which is secured to a transverse rockshaft 56 supported in any suitable manner in the tractor body 10. Secured to an external part of the rockshaft 56 is a selector lever 57 swingable between and selectively settable at either of two arcuately spaced positions 58 and 59. Position 58 corresponds to position E' and position 59 corresponds to position E''.

From the description thus far it will be seen that when the fulcrum means is changed between positions E' and E'', the lever 28 in effect pivots about the point 42 as the spaced relationship between the wear block 43 and the bending bar 24 is changed. Hence, such swinging movement has no effect on the cam follower 41 and therefore no valve-actuating forces are transmitted through the linkage 38 or servo 37. To assure that the shift of the lever is unaccompanied by changes in the valve, the means for selectively securing both positions of the lever 28 is augmented by a pair of cooperative cam elements 60 and 61 carried respectively by the lower end of the lever 28 and by the bracket 27. The element 60 is a pin extending transversely from the lower end of the lever, and the element 61 is in the form of a plunger vertically slidable in a suitable bore 62 in the bracket 27. The plunger is connected by a link 63 to the forwardly extending arm 53 of the fulcrum means 39.

The cam element 61 has a front cam surface 64 which, in the FIGURE 4 position of the cam, presents its low portion to the cam element or pin 60, thus allowing the lever 28 to assume a position in which the wear block 43 is in close proximity (actually in contact) with the front surface of the bending bar 24. When the rockshaft is turned by means of the selector 57 and associated linkage, the cam element 61 is elevated so that its high portion engages the pin 60, causing forward shifting of the lower end of the lever 28 simultaneously with forward shifting of the lever pivot axis from E' to E''. The amounts of movement at the respective portions of the lever are carefully calculated to cause the lever to swing in this manner without disturbing the linkage connection to the valve 33.

A stabilizer pin 65 depends rigidly from a rear portion of the lower end of the lever to a point behind the bending bar 24 to prevent undesirable overtravel of the mechanism because of shock loading etc.

Assuming that the system has been designed for a relatively large capacity in which the center portion of the load control shaft or bending bar 24 deflects uniformly from zero to .150 inch for zero to rated drawbar pull, the total draft load range may be divided into upper and lower portions by the selective positioning of the second end means or wear block 43 along with simultaneous relocation of the fulcrum axis. For example, when the mechanism is in position as shown in FIG. 5, the wear block 43 is spaced .050 inch ahead of the load control shaft or responder 24. This means that in the lower one-third of the total range, there will be no changes in the valve 33. Accordingly, the changes that will occur will be effective only in the upper two-thirds of the range. Going back to FIG. 4, the immediate deflection of the bar or responder 24 will cause immediate response in the lever 28, but this amount of movement is limited to the lower two-thirds of the range because the back edge of the cam element 61, as at 66, establishes a stop against deflection of the responder or load control shaft 24 beyond .100 inch.

Making further assumptions on the basis of the figures already assumed, the valve 33 may have a total movement of .63 inch. If the total .150 movement of the load responder 24 were utilized as an input to the valve, the .63 inch would be far exceeded, and special provisions would have to be made to accommodate this overtravel, or one type valve would have to be used for light-draft implements and another type valve for heavy-draft implements. But in the present case, because of the selective positioning of the fulcrum and the lower end of the lever, the valve movement remains the same in either the two-third lower range or the two-third higher range of the total range (a one-third overlap is allowed because of variations in tolerances).

According to the present invention, the same valve 33 is capable of use in tractors of different rated drawbar capacities. Likewise, the division of the total drawbar pull range into lower and upper portions enables a heavier tractor to handle light-draft implements in the position of the mechanism as shown in FIG. 4 as well as heavier draft implements when the mechanism is changed to the position of FIG. 5. The simultaneous adjustment of the fulcrum means 39 and lower or second end means 43 assures that the changes in position will be achieved without transmitting any valve-operating forces through the linkage 38 or servo 37. The arrangement does not affect the relationship between the manual control and servo control as established by the disclosures in the above patents. Likewise, the selection between draft and position control, according to the Du Shane Patent 2,921,638, may still be retained. Those charactristics have been omitted from the present disclosure because of their lack of cooperative significance in a patentable sense.

Features and advantages of the invention, other than those categorically enumerated, will become readily apparent to those versed in the art, as will many modifications and alterations, all of which may be achieved without departure from the spirit and scope of the present invention.

What is claimed is:

1. A tractor-implement draft control system including power means and a controller therefor, a draft responder yieldably mounted for movement in first and second opposite directions respectively according to increase and decrease in implement draft, a fixed support, fulcrum means on the support, and lever means on the fulcrum means and having first and second ends operatively associated respectively with the controller and responder for actuating the controller according to movement of the responder, characterized by the provision of means on the second end of the lever and engageable by the responder upon first-direction movement thereof to rock the lever about the fulcrum means for actuating the controller, said second end means being selectively positionable in first and second positions respectively proximate to and remote from the responder as respects said first-direction movement, said second position affording a lost-motion relationship between the responder and said second end means so as to selectively obtain variations in the time interval between said movement of the responder and consequent rocking of the lever; and positioning means for selectively effecting positioning of said second end means.

2. The invention according to claim 1, including movable stop means between the support and the responder and settable in a stop position for limiting first-direction movement of the responder to a predetermined amount when the lever second end means is in its first position, and means cooperative with the positioning means for moving the stop means out of said stop position when said positioning means changes said second end means to its said second position.

3. The invention according to claim 1, in which the fulcrum means is shiftable between first and second positions respectively according to the first and second positions of the second end means, the second end means is a responder-engageable abutment on said second end of the lever, the first end of the lever is pivotally connected to the controller, and the positioning means is connected to the fulcrum means to shift said fulcrum means for displacing the fulcrum axis and thereby to rock the lever bodily about its first end pivot so as to vary the relationship between said second end means and the responder.

4. The invention according to claim 3, in which the fulcrum means includes an eccentric rockably mounted on the support for changing the fulcrum axis, and the positioning means is connected to and for rocking said eccentric.

5. The invention according to claim 3, in which the positioning means includes a first portion operative on the fulcrum means, a second portion operative on the second end of the lever, and means interconnecting said two portions to shift the fulcrum axis and said second end means simultaneously.

6. The invention according to claim 5, in which said second portion includes relatively movable cooperative cam elements on said second end and on the support, and the interconnecting means is operative to move said elements relatively.

7. The invention according to claim 1, in which the fulcrum means includes a rockshaft carried by the support and including an eccentric portion operative to shift the fulcrum axis when the rockshaft is rocked, the second end means includes relatively movable cooperative cam elements respectively on the support and second end of the lever, and the positioning means includes an arm fixed to the rockshaft and operatively connected to the support-carried cam element and means for rocking the rockshaft.

8. The invention according to claim 7, including means on the support for releasably retaining the rockshaft rocking means in either of two positions according to the two positions of the second end means.

9. The invention according to claim 7, in which the support-carried cam element is movable along an axis transverse to the rockshaft axis and has a cam surface facing the lever second end, and the element on the lever second end is a cam follower engaging said surface.

10. The invention according to claim 1 in which the responder is a transverse member, the fulcrum means is disposed above said member on a main axis generally parallel to the member, the first and second ends of the lever are respectively above and below the fulcrum means, said second end depending into proximity to the member, said second end means is carried by said second end in engageable relation to the member upon first-direction movement thereof, and said positioning means is operative to vary the spacing between said member and said second end means.

References Cited

UNITED STATES PATENTS

| | | | |
|---|---|---|---|
| 2,437,875 | 3/1948 | Chambers et al. | 172—10 |
| 2,663,239 | 12/1953 | Rapp et al. | 172—10 |
| 2,974,733 | 3/1961 | Fletcher | 172—7 |
| 3,275,084 | 9/1966 | Bunting | 172—9 |

ROBERT E. PULFREY, Primary Examiner

ALAN E. KOPECKI, Assistant Examiner